United States Patent
Maruyama

(10) Patent No.: US 6,597,401 B1
(45) Date of Patent: Jul. 22, 2003

(54) IMAGE READING SYSTEM WITH FLARE COMPENSATION

(75) Inventor: Koichi Maruyama, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/175,565

(22) Filed: Oct. 20, 1998

(30) Foreign Application Priority Data

Oct. 20, 1997 (JP) ................................................ 9-287409

(51) Int. Cl.⁷ .................... G02B 13/16; G02B 5/18; H04N 5/225; H04N 9/07; H04N 3/14
(52) U.S. Cl. .................. 348/335; 348/336; 348/272; 348/273; 348/280; 359/569; 359/571
(58) Field of Search ................................. 359/565, 569, 359/571; 348/335, 336, 272, 273, 280

(56) References Cited

U.S. PATENT DOCUMENTS

| | | | |
|---|---|---|---|
| 5,014,121 A | * | 5/1991 | Hasegawa et al. ............ 348/70 |
| 5,543,966 A | * | 8/1996 | Meyers ........................ 359/565 |
| 5,680,252 A | * | 10/1997 | Sitter, Jr. et al. ........... 359/566 |
| 5,838,480 A | * | 11/1998 | McIntyre et al. ........... 359/205 |
| 5,930,043 A | * | 7/1999 | Ogawa ........................ 359/566 |
| 6,055,105 A | * | 4/2000 | Boku et al. .................. 359/566 |

FOREIGN PATENT DOCUMENTS

JP          9-238357       9/1997       ............ H04N/9/07

* cited by examiner

Primary Examiner—Ngoc-Yen Vu
Assistant Examiner—Tia M. Harris
(74) Attorney, Agent, or Firm—Greenblum & Bernstein, P.L.C.

(57) ABSTRACT

An image reading system includes an imaging optical system for forming an image of an object, the optical system including at least one refractive lens and a diffractive grating blazed at a predetermined wavelength, an aperture stop positioned close to the diffractive grating, main image sensors for receiving the images of respective color components, and a flare compensating unit for compensating the image signals input from the main image sensors to eliminate flare components due to unnecessary order diffractive light.

19 Claims, 12 Drawing Sheets

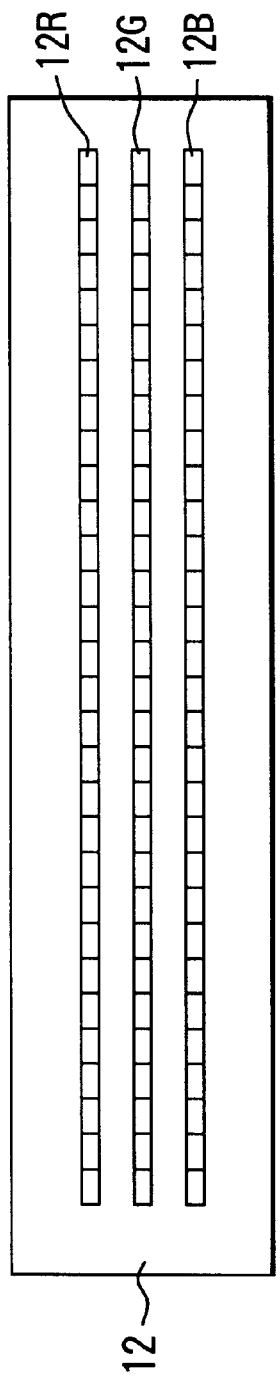
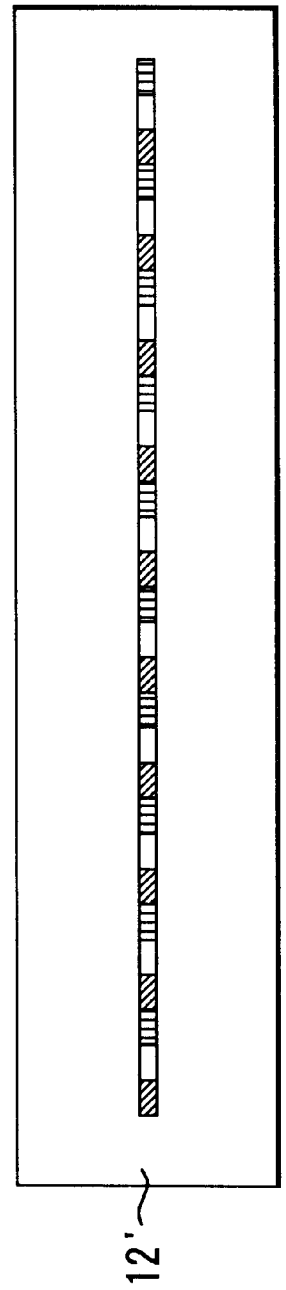

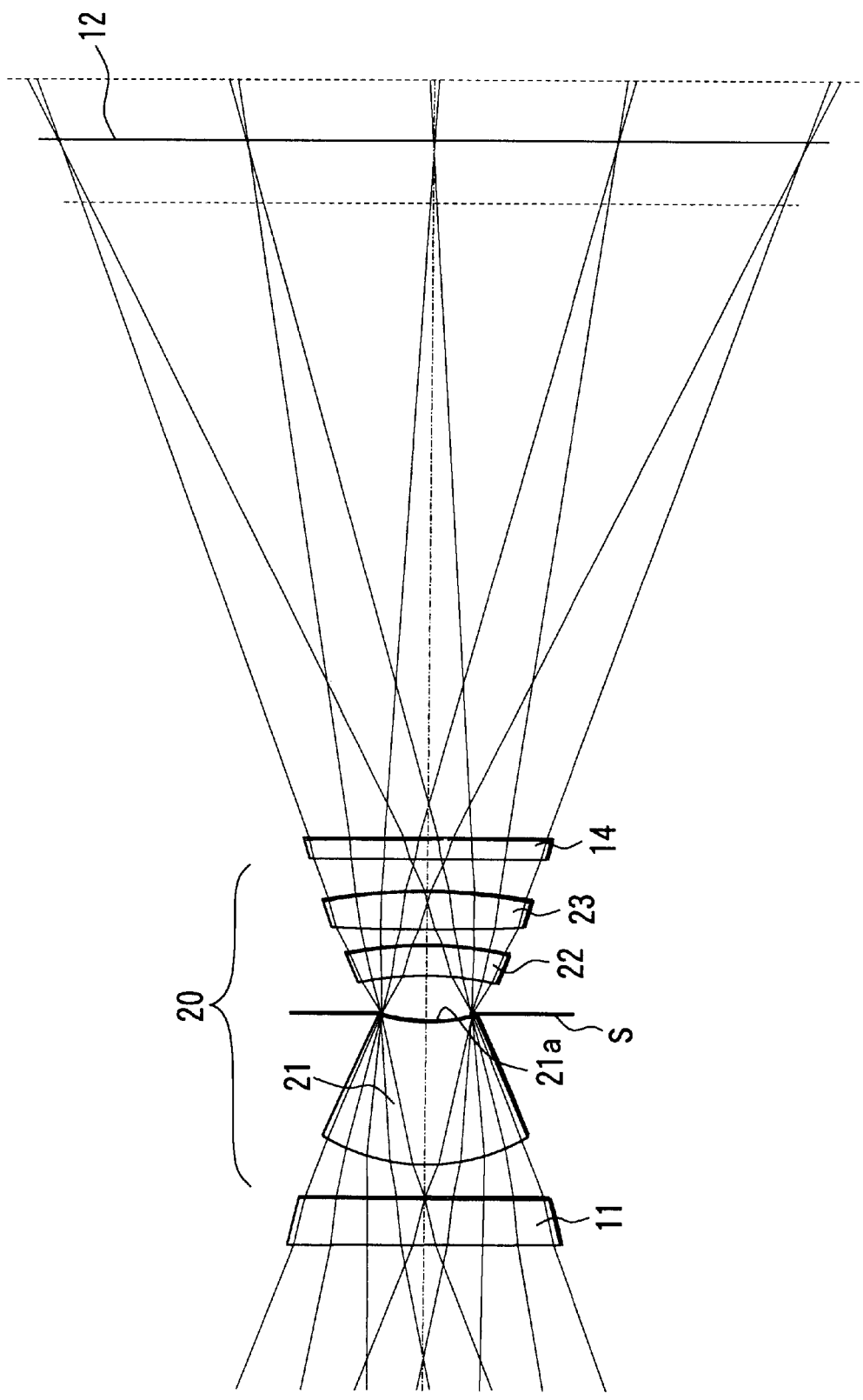

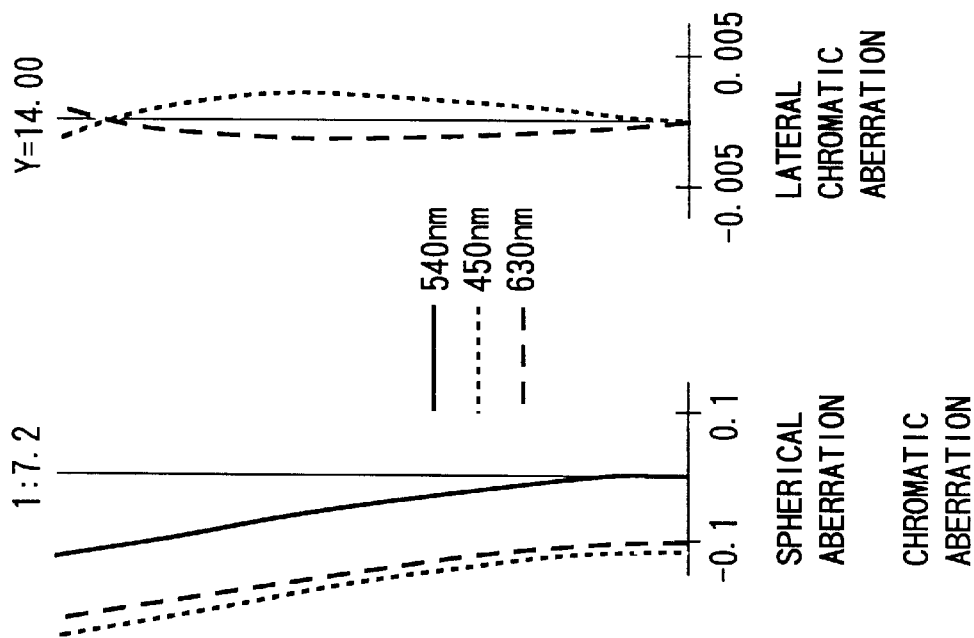
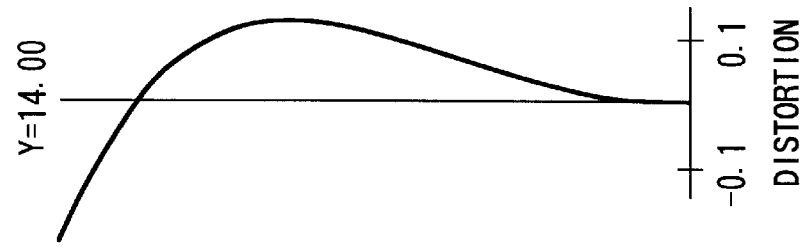
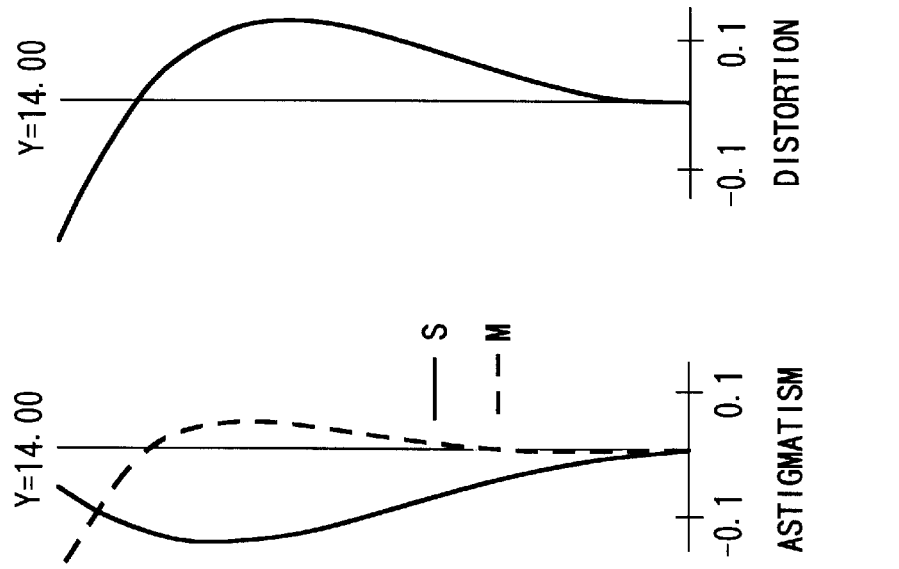

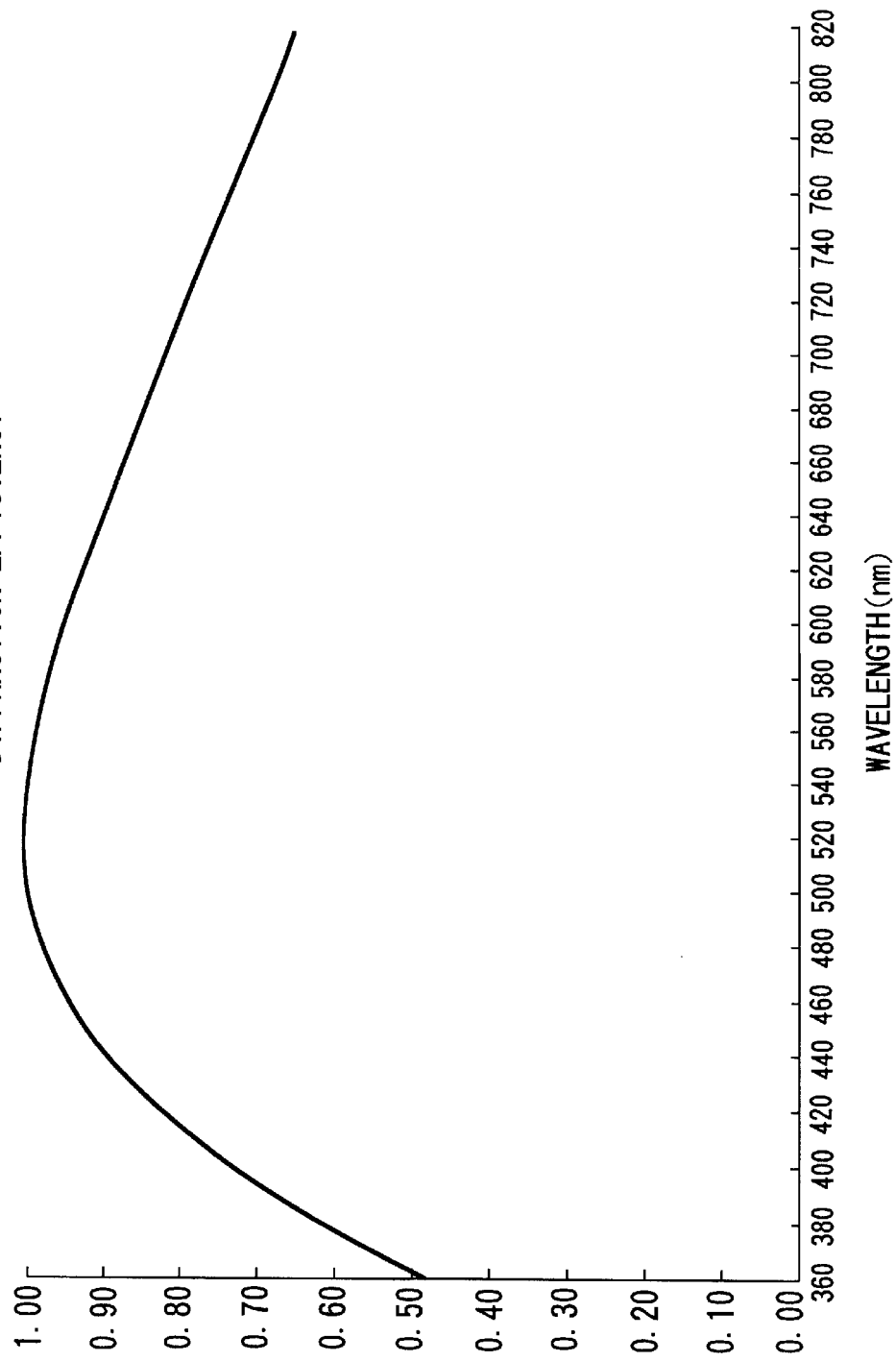

IMAGE READING SYSTEM WITH FLARE COMPENSATION

BACKGROUND OF THE INVENTION

The present invention relates to an image reading system that reads a color image formed on an image sensor through an imaging optical system including a diffractive grating.

An image input device such as an image scanner or a digital facsimile includes an image reading system that comprises an imaging optical system and an image processing device. An image of the object is formed on an image sensor such as a CCD through the imaging optical system, the image processing device process the image data from the CCD to generate a picture signal such as an RGB component signal.

Recently, the resolution of the input device is developed to take a clearer image without increasing the device size. Increased resolution of the input device requires an increase of density of pixels in the CCD. This also requires a high resolution (low aberration) lens in the imaging optical system.

The imaging optical system may employ a diffractive grating in addition to the refractive lenses to compensate chromatic aberration. Since the dispersion of the diffractive grating has opposite sign to that of the refractive lenses, a use of the diffractive grating reduces the chromatic aberration without increasing a number of elements.

The diffractive grating diffracts and separates incident light into various order diffractive lights. When the diffractive grating is used instead of the refractive lens, the diffractive grating is designed so as to maximize a diffraction efficiency of the predetermined order diffractive light. The diffraction efficiency is a ratio of intensity of the predetermined order diffractive light to that of the incident light. In general, the grating is designed to maximize the intensity of the first-order diffractive light.

However, the diffraction efficiency varies according to the wavelength of the used light. An increase of a difference between the wavelength of the used light and the designed wavelength decreases the diffraction efficiency. For example, when the diffractive grating is optimized (blazed) at wavelength of 525 nm, the diffraction efficiency at 525 nm is 100% while that at 436 nm is 87%, and that in 656 nm is 88%. That is, the intensity of the first-order light decreases and the intensity of the other order light increases.

Since any order light except the first-order has different convergence from that of the first-order light, the decrease of the diffraction efficiency causes flare that deteriorates quality of the image.

Japanese laid-open patent publication No. Hei 9-238357 discloses an image reading system that employs an image processing unit to eliminate flare component due to the use of a diffractive grating.

The imaging optical system of the publication comprises nine lenses and a diffractive element. The diffractive element, which is a plane parallel plate on which a diffractive grating is formed, is arranged between the ninth lens and the CCD. On the other hand, an aperture stop is disposed between the fourth lens and the fifth lens.

In the above construction, since the extent of the blurred spot of the unnecessary order diffractive light (flare component) varies depending on the position of the target pixel on the CCD, the image processing unit should calculate the effect of the flare component with considering the position of the target pixel.

However, such the process increases a load of the processing unit because of enormous calculations.

SUMMARY OF THE INVENTION

It is therefore an object of the present invention to provide an image reading system to reproduce a clearer image with decreasing a load of the processing unit as compared with the conventional system.

According to a first aspect of the invention, an image reading system includes an imaging optical system that includes at least one refractive lens and a diffractive grating blazed at a predetermined wavelength, the optical system forming an image of an object by a predetermined order diffractive light, an aperture stop positioned close to said diffractive grating, a main image sensor for receiving the images of respective color components, and a flare compensating unit for compensating original image signals from the main image sensor to eliminate flare components due to unnecessary order diffractive light except the predetermined order diffractive light.

With this construction, the flare components are eliminated by only calculating the original image signals. Further since the aperture stop is close to the diffractive grating, the blurred spot of the unnecessary order diffractive light will be constant regardless of the position on the image plane. This decreases a load for the calculating unit because the position of a target pixel under compensation is not required to be taken in the flare compensation.

The diffractive grating may be formed on the surface of the refractive lens.

The compensating means may compensate the original image signals of the color components except the color component including the blazed wavelength.

In general, the color components are R (red), G (green) and B (blue) and the blazed wavelength is included in the G component. In such the case, the compensating means compensates the original image signals of the R and B component.

Further, the compensating means may compensate the original image signals of a target pixel based on the original image signals of a surrounding pixels within a predetermined image area. According to the first aspect, the extent of said image area can be considered as constant regardless of the position of the target pixel.

According to the second aspect, the image reading system includes an imaging optical system that includes at least one refractive lens and a diffractive grating blazed at a predetermined wavelength, the imaging optical system forming an image of an object by a predetermined order diffractive light, a main image sensor for receiving the image of respective color components, at least one auxiliary image sensor located at a defocus position being different from an equivalent plane with the main image sensor to output average intensity signals of the predetermined color component, a beam splitter for dividing light from the object through the imaging optical system between the main image sensor and the auxiliary image sensor, and means for compensating the image signals of the target pixel of the main image sensor using the average intensity signals of the pixel corresponding to the target pixel in order to eliminate flare components due to unnecessary order diffractive light except the predetermined order diffractive light.

With this construction, the auxiliary image sensor detects the optically averaged light due to the defocus arrangement, the compensation means is not required for the averaging calculation. It reduces the load of the compensation means.

According to the third aspect of the present invention, the image reading system includes an imaging optical system that includes at least one refractive lens and a diffractive grating blazed at a predetermined wavelength, the optical system forming an image of an object by a predetermined order diffractive light, a main image sensor for receiving the images of respective color components, at least one light receiving element for receiving the light from whole reading area of the object to output total intensity signal, and means for compensating the image signals of the target pixel of the main image sensor using the total intensity signal from the light receiving element in order to eliminate flare components due to unnecessary order diffractive light except the predetermined order diffractive light.

With this construction, the compensating means repeats the identical correction for all of the effective pixels based on the total intensity signal. This process is effective to a document.

BRIEF DESCRIPTION OF THE DRAWINGS

FIG. 2A shows a main CCD of the image scanner shown in FIG. 1;

FIG. 2B shows a variation of the main CCD;

FIG. 6 is a lens diagram of an imaging optical system according to the first embodiment;

FIGS. 7A through 7D show various aberrations of the optical system shown in FIG. 6;

FIG. 8 is a graph showing a diffraction efficiency of the diffractive grating of the first embodiment;

DETAILED DESCRIPTION OF THE PREFERRED EMBODIMENTS

Preferred embodiments of the present invention will be discussed hereinafter. In all of three embodiments, the present invention is applied to a color image scanner that reads a color image of an object and outputs picture signal as image data. Particularly, the first and second embodiments are suitable for reading a multi-gradation image such as a color photograph, and the third embodiment is suited for reading a character image such as a document.

First Embodiment

Figure 1:
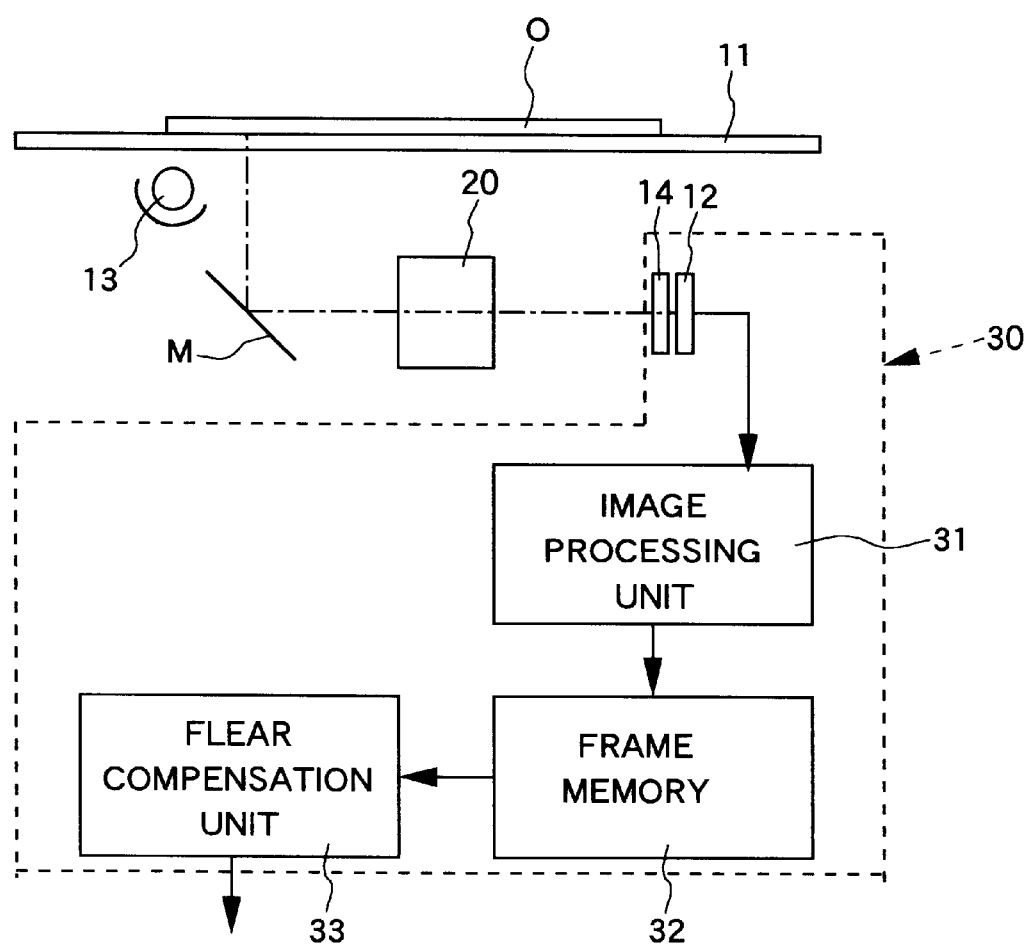
FIG. 1 shows an optical system and a block diagram of an image scanner according to the first embodiment.

The image scanner of the first embodiment comprises, as shown in FIG. 1, a contact glass 11, a light source 13, an imaging optical system 20, a color separation filter 14 and an image processing device 30. The image processing device 30 comprises a main CCD 12 as a main image sensor, an image processing unit 31, a frame memory 32 and a flare compensating unit 33.

The light source 13 emits white light that has continuous emission spectra containing visible range of wavelength.

The main CCD 12 is provided with three line sensors 12R, 12G and 12B as main image sensors for R (red), G (green), B (blue) components as shown in FIG. 2A. Each of the line sensors includes a lot of sensor elements (pixels) that are linearly arranged. A color separation filter 14 is located in front of the main CCD 12. The filter 14 includes three portions that allow transmitting the R, G and B components respectively.

It is possible to use a CCD 12' as shown in FIG. 2B instead of the CCD 12. The CCD 12' has a line sensor in which small parts of sensor bits 12'R, 12'G and 12'B for the R, G and B components are repeated.

The imaging optical system 20 is a lens system that is provided with diffractive grating and refractive lenses. The diffractive grating is used to obtain a high optical performance (i.e., low chromatic aberration) with a small number of lenses. As described below, an aperture stop is disposed in the imaging optical system 20 so that it is close to the diffractive surface.

An object O to be read is put on the contact glass 11 and illuminated by the light source 13. The reflected light from the object O is reflected by a mirror M to be incident in the imaging optical system 20.

An image of a linear part of the object O is formed on the main CCD 12 through the imaging optical system 20. The image processing unit 31 converts analog sensor signals from the main CCD 12 to digital original image signals and stores the original image signals into the frame memory 32.

The image scanner of the embodiment includes a well-known sheet feed mechanism or an optical scan mechanism that is not shown in FIG. 1. The feed or scan mechanism changes positional relationship between the main CCD 12 and the object O without changing a distance therebetween.

The original image signals are mapped on the frame memory 32 as a two dimensional picture data according to the feeding or scanning. The flare compensation unit 33 compensates the original image signals stored in the frame memory 32 in order to remove flare components included in the original image signals due to the wavelength dependence of the diffraction efficiency of the diffractive grating.

The compensated image signals from the flare compensation unit 33 can be processed as the same manner as the signals detected by the optical system without a diffractive grating.

A principle of the flare compensation will be discussed below.

Figure 3:
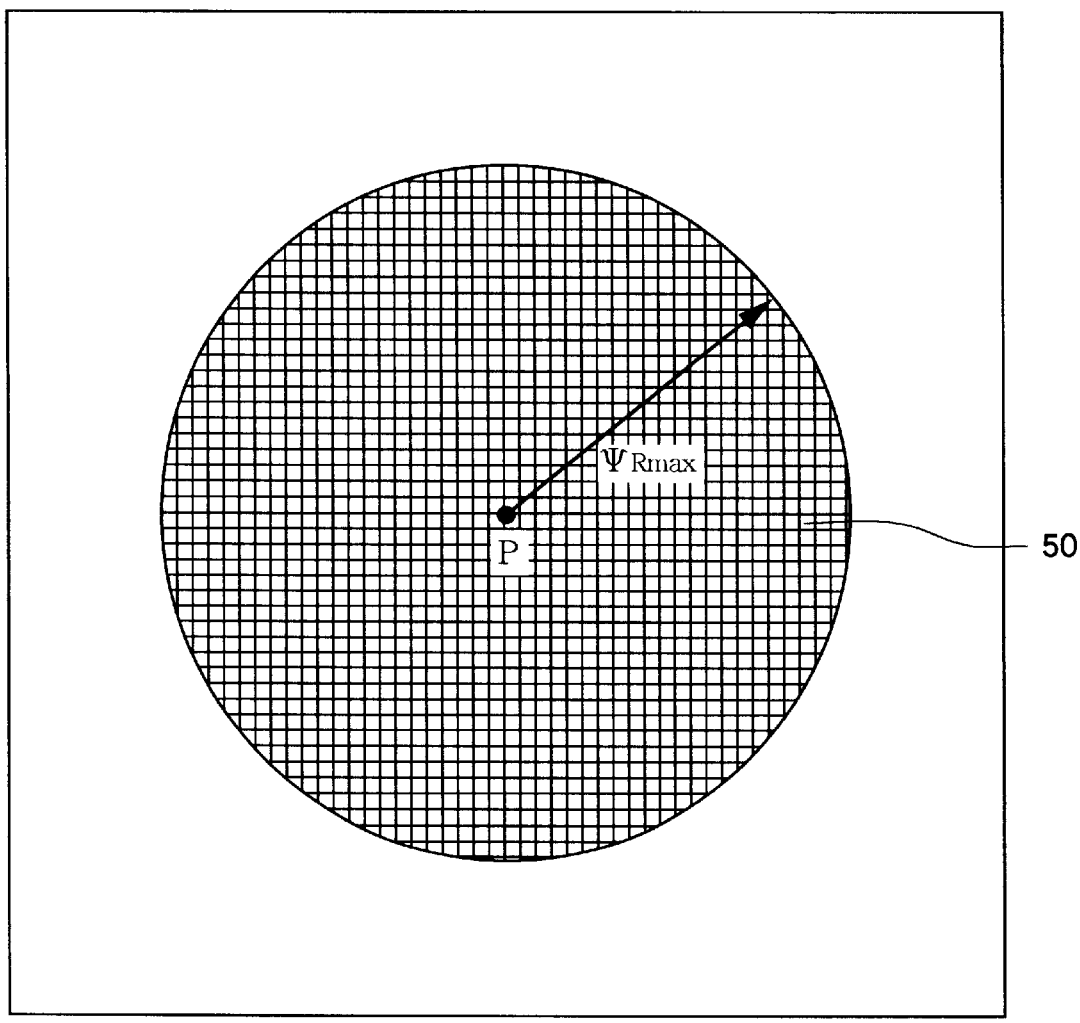
FIG. 3 shows an object point on an object to be read.
Figure 4:
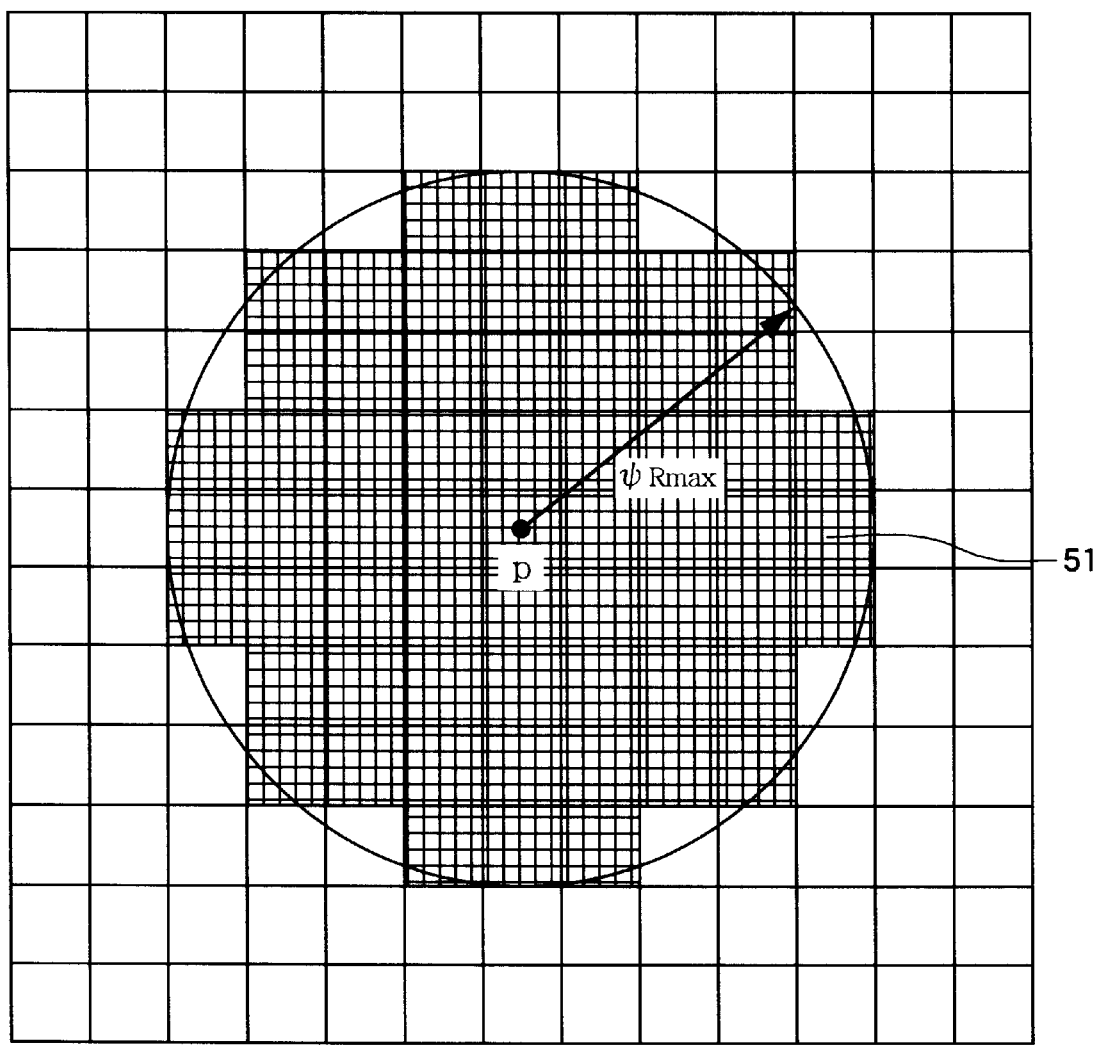
FIG. 4 shows an image point and an image area.

FIG. 3 shows an object point P on the object to be read, FIG. 4 shows an image point p that is conjugate with the object point P.

As described above, the diffractive grating has the wavelength dependence. As the difference of wavelength of the used light becomes larger, the diffraction efficiency decreases. This decreases the intensity of the first-order diffractive light and increases the intensities of the other order diffractive lights.

Here, the following conditions (1) through (4) are assumed.

(1) The first-order diffractive light is used to form an image, and the zeroth and second-order diffractive lights form the same size of blurred spots on the image plane of the first-order diffractive light.

(2) The size of the blurred spot only depends on the wavelength but does not depend on the position in the image plane.

(3) There are no diffractive lights higher than the second-order.

(4) The diffraction efficiency of each of the R, G and B component is constant in each wavelength range.

The close arrangement of the aperture stop with the diffractive surface allows the assumptions of the conditions (1) and (2). If the imaging optical system has vignetting or images of different magnification are formed by the zeroth and second-order diffractive lights, the size of the blurred spots will vary depending on the position in the image plane, and this requires an independent compensation for each of the image points. In the first embodiment, the arrangement of the aperture stop reduces the vignetting and the position dependence of the magnification. And therefore, the conditions (1) and (2) are almost fulfilled.

According to the condition (3), there are the slight amount of higher order diffractive lights in fact. However, these are ignored in the calculation of the first embodiment. It is enough to compensate the zeroth and second order diffractive lights.

Strictly speaking, the condition (4) is not fulfilled because the diffraction efficiency has wavelength dependency. However, the narrow setting of bandwidth for each color component practically allows the assumption of the condition (4).

The light intensity of the image point p is defined by the sum of the first-order diffractive light from the object point P and the zeroth and second-order diffractive lights from an object area 50. The object area 50 on the object plane is represented by the circle of which center is P and radius is $\Psi_{Rmax}$ for the R component. The zeroth and second-order diffractive lights from any points within the object area 50 affect the light intensity of the image point p.

An image area 51 on the image plane corresponds to the object area 50. The first-order diffractive light from any points within the object area 50 reach within the image area 51. The image area 51 on the image plane is represented by the circle of which center is p and radius is $\Psi_{Rmax}$. The values of the radii of the object area 50 and the image area 51 depend on the wavelength. For the G component, $\Psi_{Gmax}$ and $\Psi_{Gmax}$ are used, and for the B component, $\Psi_{Bmax}$ and $\Psi_{Bmax}$ are used.

The radius $\Psi_{Rmax}$ of the image area of the R component is determined according to the following equation:

$$\Psi_{Rmax} = (\Delta 0R - \Delta 2R)/(FNo \times 4)$$

Here $\Delta 0R$ and $\Delta 2R$ are shift amounts of image planes of the zeroth and second-order diffractive lights from the image plane of the first order diffractive light with respect to the R component, FNo is an effective F-number of the imaging optical system 20. The radius of the image area of the G or B component may be found by the similar calculation.

Since the zeroth or second-order diffractive light has different convergence from the first-order diffractive light, the image planes of the zeroth or second-order diffractive light is not coincident with the main CCD 12 that is the image plane of the first-order diffractive light. The distance between the image planes of the zeroth and first-orders diffractive light is almost equal to the distance between the image planes of the second and first-order diffractive light. And the image plane of the zeroth-order diffractive light is positioned at the opposite side of that of the second-order diffractive light across the image plane of the first-order diffractive light.

Since the shift amount of the image planes of the zeroth and second-order diffractive lights are almost identical to each other, the zeroth and second-order diffractive lights are defocused to form blurred spot on the main CCD 12. Practically, it is considered that the diameter of the blurred spot (the image area) is equal to a quotient that is found by dividing an average shift amount by the effective F-number.

The average shift amount is found by $(\Delta_{0R}-\Delta_{2R})/2$, the radius of the image area is defined as $(\Delta 0R-\Delta 2R)/(FNo \times 4)$.

Use the different radius for each of the zeroth and second-order diffractive lights are possible but is not required in practice. In the first embodiment, only the average radius is used.

When the intensities of the R, G and B components at the object point P are RP, GP and BP and these at the image point p are Rp, Gp and Bp respectively, the relationships between the intensities at the object point P and at the image point p are expressed as follows:

$$Rp \propto E_R \times RP + (1-E_R)\left(\sum_{\Psi=0}^{\Psi Rmax} RP_\Psi\right)/S_R$$

$$Gp \propto E_G \times GP + (1-E_G)\left(\sum_{\Psi=0}^{\Psi Gmax} GP_\Psi\right)/S_G$$

$$Bp \propto E_B \times BP + (1-E_B)\left(\sum_{\Psi=0}^{\Psi Bmax} RP_\Psi\right)/S_B$$

Where, $E_R$, $E_G$ and $E_B$ represent the diffraction efficiencies at the center wavelengths of the respective R, G and B components, $RP_\Psi$, $GP_\Psi$ and $BP_\Psi$ represent the light intensities of the respective R, G and B components at the point away from the object point P by distance $\Psi$, and $S_R$, $S_G$ and $S_B$ represent square measures of the object area 50 for the R, G and B components ($S_R=\pi\Psi_{Rmax}^2$, $S_G=\pi\Psi_{Gmax}^2$, $S_B=\pi\Psi_{Bmax}^2$). For example, the value of $(\Sigma RP_{105})/S_R$ equals an average light intensity in the object area 50 for the R component.

The above relationship with respect to the light intensities should be replaced to the calculation of the electric signals in order to reproduce a picture data of an object based on the compensated image signals.

The flare compensating unit 33 should produce compensated image signals Rop, Gop and Bop, which are corresponding to the intensities RP, GP and BP, based on the original image signals Rip, Gip and Bip stored in the frame memory 32. Since the blazed wavelength of the diffractive grating is nearly equal to the center wavelength of the G component, the decreases of the diffraction efficiency of the G component can be ignored. This allows eliminating the flare compensation for the G component. The flare compensation unit 33 removes the flare components from the original image signals Rip and Bip to generate the compensated image signals Rop and Bop according to the following calculations.

$$Rop = Rip/E_R - (1-E_R)\left(\sum_{\psi=0}^{\psi Rmax} Rip_\psi\right)/(s_R \times E_R)$$

Gop=Gip $$Bop = Bip/E_B - (1-E_B)\left(\sum_{\psi=0}^{\psi Bmax} Rip_\psi\right)/(s_B \times E_B)$$

Where, $Rip_\psi$ and $Bip_\psi$ represent the original image signals of the respective R and B components from the pixel corresponding to the point away from the image point p by distance $\Psi$, and $s_R$ and $s_B$ represent square measures of the image area 51 for the R and B components ($s_R=\pi\Psi_{Rmax}^2$, $s_B=\pi\Psi_{Bmax}^2$). For example, the value of $(\Sigma Rip_\psi)/s_R$ equals an average original image signal for the R component.

The above description shows the process to find the compensated image signals Rop, Gop and Bop at the image point p. In practice, the similar calculation is required for each of pixels within a predetermined area mapped on the frame memory 32.

Figure 5:
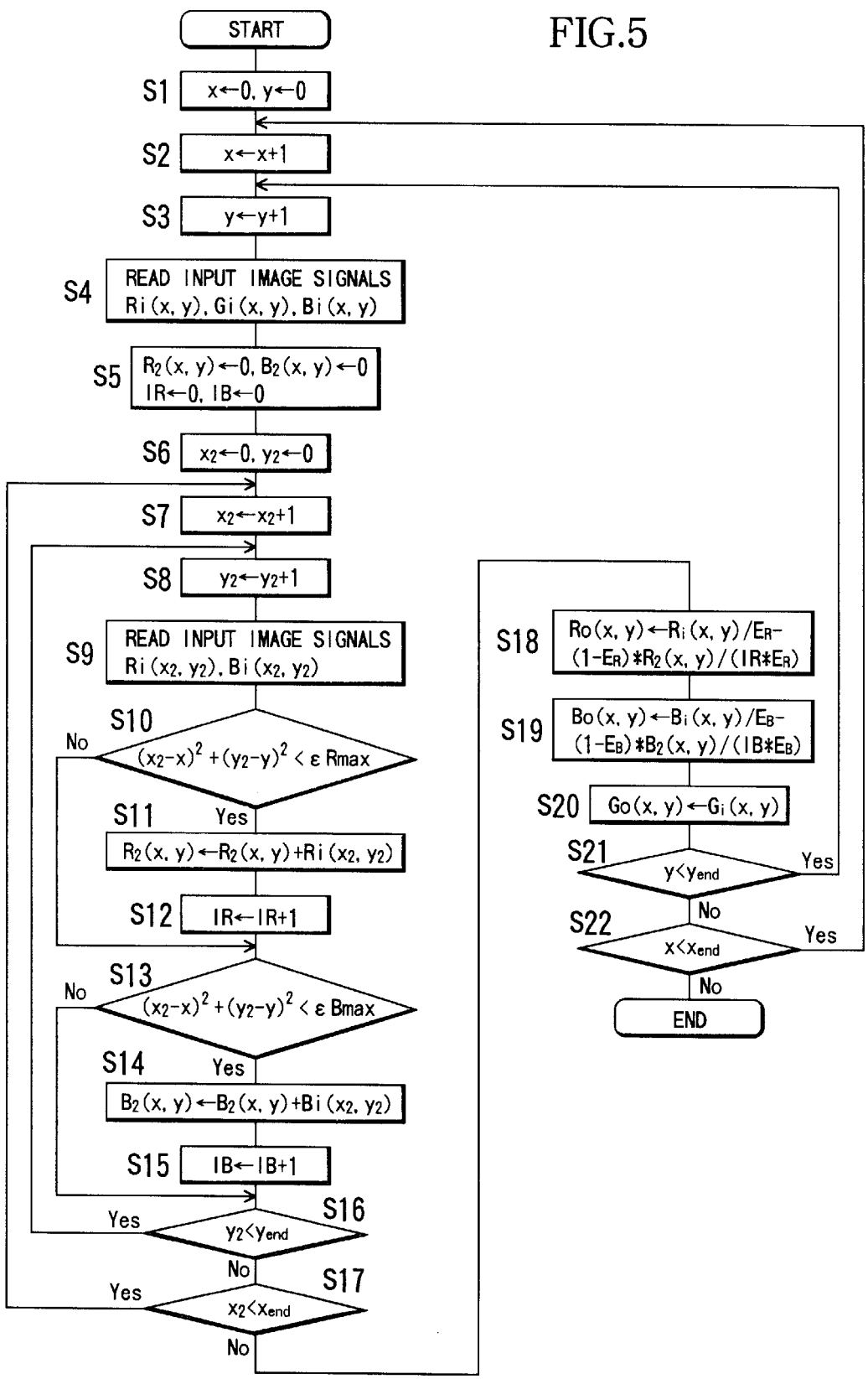
FIG. 5 is a flowchart showing process of the first embodiment.

FIG. 5 shows a flowchart of the process to find the compensated image signals of the pixels in the predetermined area. In the flowchart, the image point is represented by an x-y coordinate. The original image signals of the target pixel are read from the frame memory 32 at the step 4 (S.4). The process of S7 through S17 detects the total magnitude of the pixels in the image area 51 around the target pixel. The number of the pixels IR or IB represents the square measure of the image area. In this process, the original image signals are read for all of pixels within the predetermined area, and the signals of the pixels of which position is included in the image area 51 of the target pixel are only accumulated.

The compensated image signals are calculated at steps 18 and 19 for the R and B components. There is no compensation for the G component.

FIG. 6 shows the concrete construction of the imaging optical system 20. The optical system 20 comprises a first lens 21, an aperture stop S, a second lens 22 and a third lens 23. The first lens 21 is a diffractive-refractive hybrid lens where a diffractive grating is formed on a lens surface of the refractive lens. The grating is similar with a Fresnel lens, it is formed as a lot of concentric rings each of which is a wedge shape. The boundary between the adjacent rings is a step to give a predetermined optical path difference. The first lens 21 has the diffractive grating on the image side surface 21a, and the aperture stop S is located adjacent to this image side surface 21a of the first lens 21.

The numerical construction of the imaging optical system 20 is described in TABLE 1. In the table, r (mm) denotes a radius of curvature of a surface (the values at the vertex for aspherical surfaces), d (mm) denotes a distance between the surfaces along the optical axis, N denotes a refractive index at a wavelength of 540 nm, vd denotes an Abbe number and Nd denotes a refractive index at a wavelength of 588 nm (d-line).

TABLE 1

| Surface Number | R | D | N | vd | Nd |
|---|---|---|---|---|---|
| 1 | 6.742 | 4.470 | 1.52798 | 56.3 | 1.52538 |
| 2 | 5.811 | 1.480 | — | — | — |
| 3 | -11.306 | 1.000 | 1.52798 | 56.3 | 1.52538 |
| 4 | -16.561 | 0.480 | — | — | — |
| 5 | 72.553 | 1.280 | 1.77682 | 49.6 | 1.77250 |
| 6 | -21.308 | — | — | — | — |

The image side surface of the first lens 21, which is represented by the surface number 2, is formed as the diffractive surface where the diffractive grating is formed on the aspherical base surface. The image side surface of the third lens 23, which is represented by the surface number 6, is an aspherical surface.

An aspherical surface is expressed by the following equation:

$$X(h) = \frac{h^2 c}{1 + \sqrt{1 - (1+K)h^2 c^2}} + A_4 h^4 + A_6 h^6 + A_8 h^8 + A_{10} h^{10}$$

X(h) is a SAG, that is, a distance of a curve from a tangential plane at a point on the surface where the height from the optical axis is h. C is a curvature (1/r) of the vertex of the surface, K is a conic constant, $A_4$, $A_6$, $A_8$ and $A_{10}$ are aspherical surface coefficients of fourth, sixth, eighth and tenth orders. The constant K and coefficients $A_4$, $A_6$, $A_8$ and $A_{10}$ are shown in the following TABLE 2.

TABLE 2

| 4th surface | 8th surface |
|---|---|
| K = 0.00000 | K = 0.00000 |
| $A_4$ = 0.54350 × $10^{-3}$ | $A_4$ = -0.27480 × $10^{-3}$ |
| $A_6$ = 0.61370 × $10^{-4}$ | $A_6$ = -0.30440 × $10^{-4}$ |
| $A_8$ = 0.00000 | $A_8$ = 0.00000 |
| $A_{10}$ = 0.00000 | $A_{10}$ = -0.90000 × $10^{-7}$ |

The diffractive grating formed on the lens surface is expressed by the following polynomial expression:

$$\Phi(h) = (P_2 h^2 + P_4 h^4 + P_6 h^6) \times \lambda$$

$\Phi(h)$ is an optical path differential function, $P_2$, $P_4$ and $P_6$ are diffractive coefficients of second, fourth and sixth orders. The unit of the function $\Phi(h)$ is γ (wavelength). The function $\Phi(h)$ represents an optical path difference between an imaginary ray assumed that it is not diffracted by the grating and an actual ray that is diffracted by the grating, at a point on the grating where the height from the optical axis is h. In such expression, a negative value of the second order coefficient $P_2$ represents a positive paraxial power of the diffractive grating. Further, the negative power increases with increasing the distance from the optical axis when the fourth order coefficient $P_4$ is larger than zero.

In this embodiment, the diffractive grating is designed so as to blaze at 525 nm.

The coefficients of the diffractive grating in this embodiment are as follows.

$p_2 = -4.251$
$P_4 = -3.140 \times 10^{-2}$
$P_6 = -5.100 \times 10^{-4}$

FIG. 7 shows third order aberrations of the imaging lens according to the embodiment. FIG. 7A shows spherical aberrations at 450 nm, 540 nm and 630 nm, FIG. 7B shows a lateral chromatic aberration at the same wavelengths as in FIG. 7A, FIG. 7C shows an astigmatism (S: Sagittal, M: Meridional) and FIG. 7D shows distortion. The vertical axis represents F-number in FIG. 7A and a distance Y (mm) from the optical axis on the image plane in each of FIGS. 7B through 7D. Unit of the horizontal axis is "mm" in each of FIGS. 7A through 7C and "percent" in FIG. 7D.

The concrete example of the flare compensation according to the first embodiment will be discussed.

FIG. 8 shows the wavelength dependency of the diffraction efficiency of the imaging optical system 20 according to the above concrete construction. Although the imaging optical system 20 is designed to minimize aberrations at 540 nm, the diffractive grating is blazed at 525 nm in order to decrease the flare of the B component.

Figure 9:
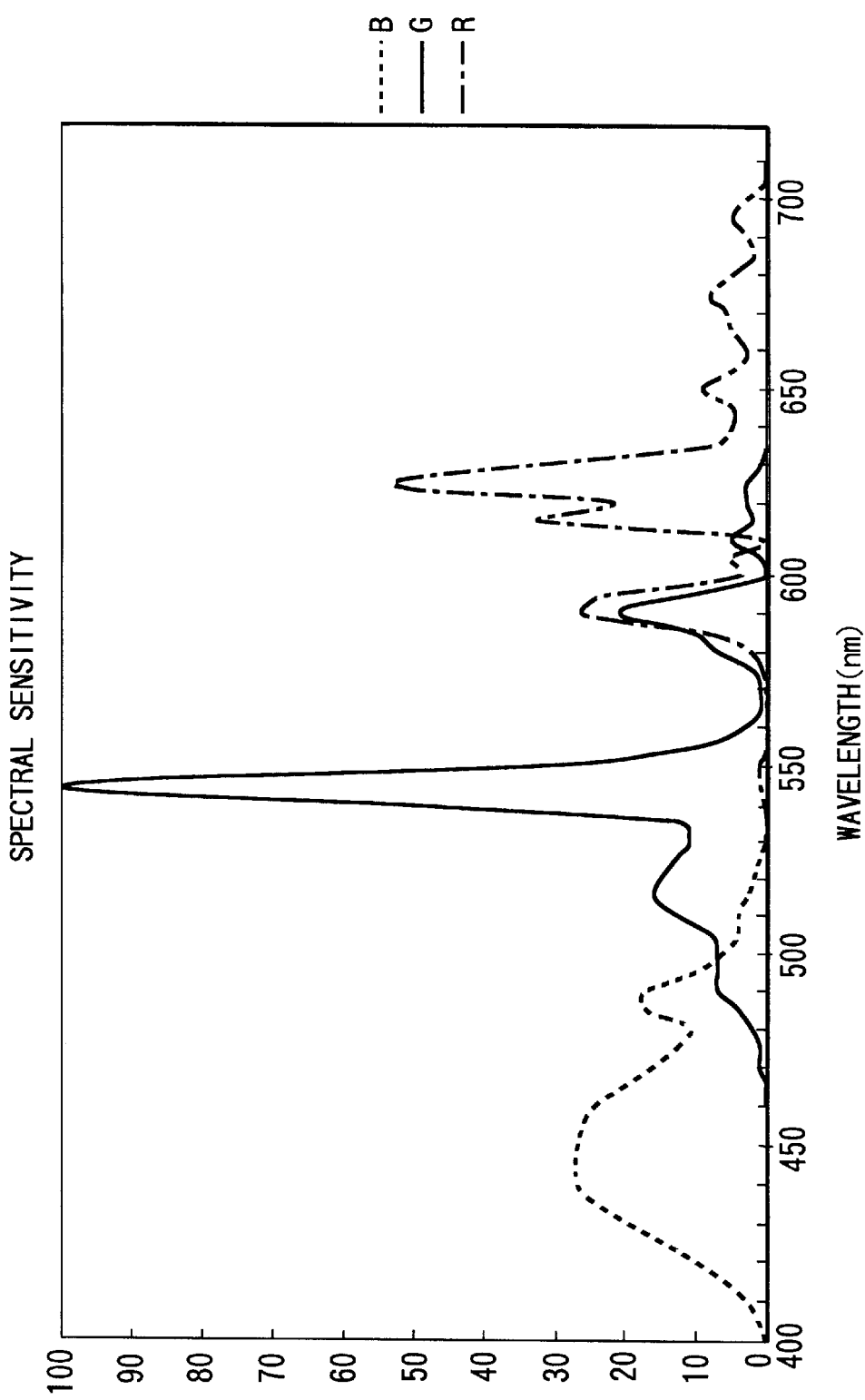
FIG. 9 is a graph showing a spectral sensitivity of the line sensors of the main CCD of the first embodiment.

A transmittance of the color separation filter 14 depends on wavelength where the transmittance at a center wavelength of the G component is relatively higher than the transmittance at center wavelength of the R and B components. Center wavelengths at the peak sensitivity of the line sensors 12R, 12G and 12B of the main CCD 12 are 625 nm, 544 nm and 457 nm respectively. FIG. 9 shows a spectral sensitivity of the line sensors of the main CCD 12 when the spectral characters of the light source 13, the color separation filter 14 and the line sensors are taken in the consideration.

Figure 10:
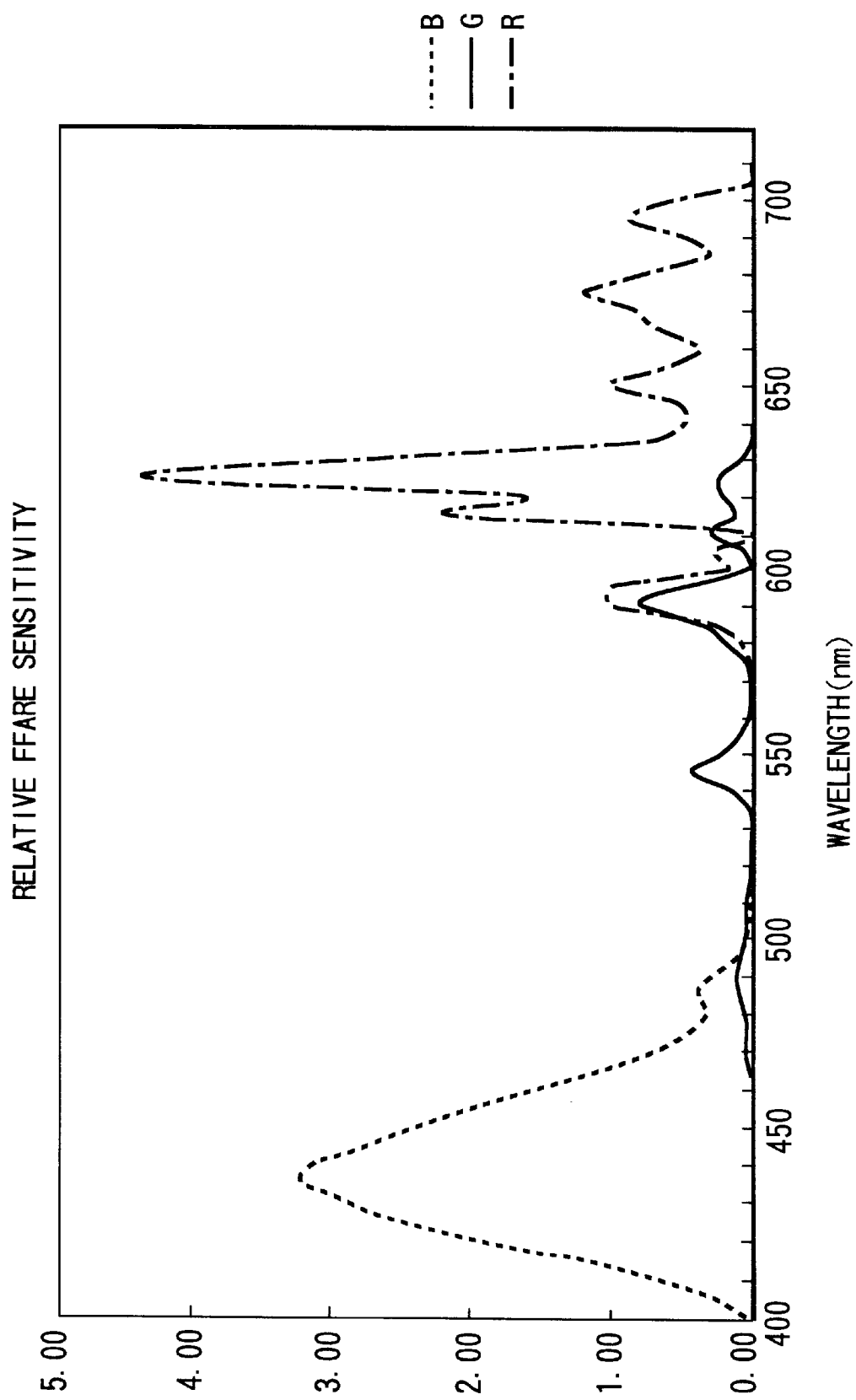
FIG. 10 is a graph showing a relative flare sensitivity of the first embodiment.

The combination of the diffraction efficiency shown in FIG. 8 and the spectral sensitivity shown in FIG. 9 results relative flare sensitivity as shown in FIG. 10. Since the diffractive grating is blazed at the wavelength within the G component, the flare sensitivity of the G component is lower than that of the R or B component.

The diffraction efficiencies for zero, first and second-orders at the center wavelengths of the main CCD 12 are shown in the following TABLE 3.

TABLE 3

| Wavelength | Zeroth-order | First-order | Second-order |
|---|---|---|---|
| 625 nm | 0.0333 | 0.9186 | 0.0175 |
| 544 nm | 0.0013 | 0.9960 | 0.0011 |
| 457 nm | 0.0156 | 0.9293 | 0.0284 |

Since the unnecessary diffractive light (i.e. zeroth and second-orders) increases with the increased difference from the blaze wavelength, the center wavelength of the flare distribution in the B component is shorter than the center wavelength of the line sensor 12B, and that in the R component is longer than the center wavelength of the line sensor 12R.

The average diffraction efficiencies $E_R$, $E_G$ and $E_B$ for the R, G and B components are about 92%, 100% and 92% respectively.

On the other hand, the average flare ratios are 0.0835, 0.0120 and 0.0834 for the line sensors 12R, 12G and 12B respectively. If there is no flare compensation, about 8% of the incident light is not focused on the main CCD 12 for the R and B components and it results a lowered image contrast.

The following TABLE 4 shows the average radius of the image area 51 of the zeroth and second-order diffractive lights for the R and B components that are determined from simulated spot diagrams.

TABLE 4

| Wavelength | Order | Radius |
|---|---|---|
| 630 nm | 0 | 0.16 mm |
| 630 nm | 2 | 0.20 mm |
| 450 nm | 0 | 0.12 mm |
| 450 nm | 2 | 0.15 mm |

With this result, it can be assumed that the radius $\Psi_{Rmax}$ of the image area 51 for the R component is 0.18 mm and the radius $\Psi_{Bmax}$ for the B component is 0.13 mm.

The flare compensation unit 33 calculates the compensated image signals Rop, Gop and Bop according to the following equations.

$$Rop = Rip \Big/ 0.92 - 0.08 \left( \sum_{\psi=0}^{0.18} Rip_\psi \right) \Big/ (s_R \times 0.92)$$

$$Gop = Gip$$

$$Bop = Bip \Big/ 0.92 - 0.08 \left( \sum_{\psi=0}^{0.13} Bip_\psi \right) \Big/ (s_B \times 0.92)$$

Second Embodiment

An image scanner of the second embodiment is provided with a pair of auxiliary CCD that output average intensity signals. Use of the averaged intensity signal eliminates the averaging process in the first embodiment.

Figure 11:
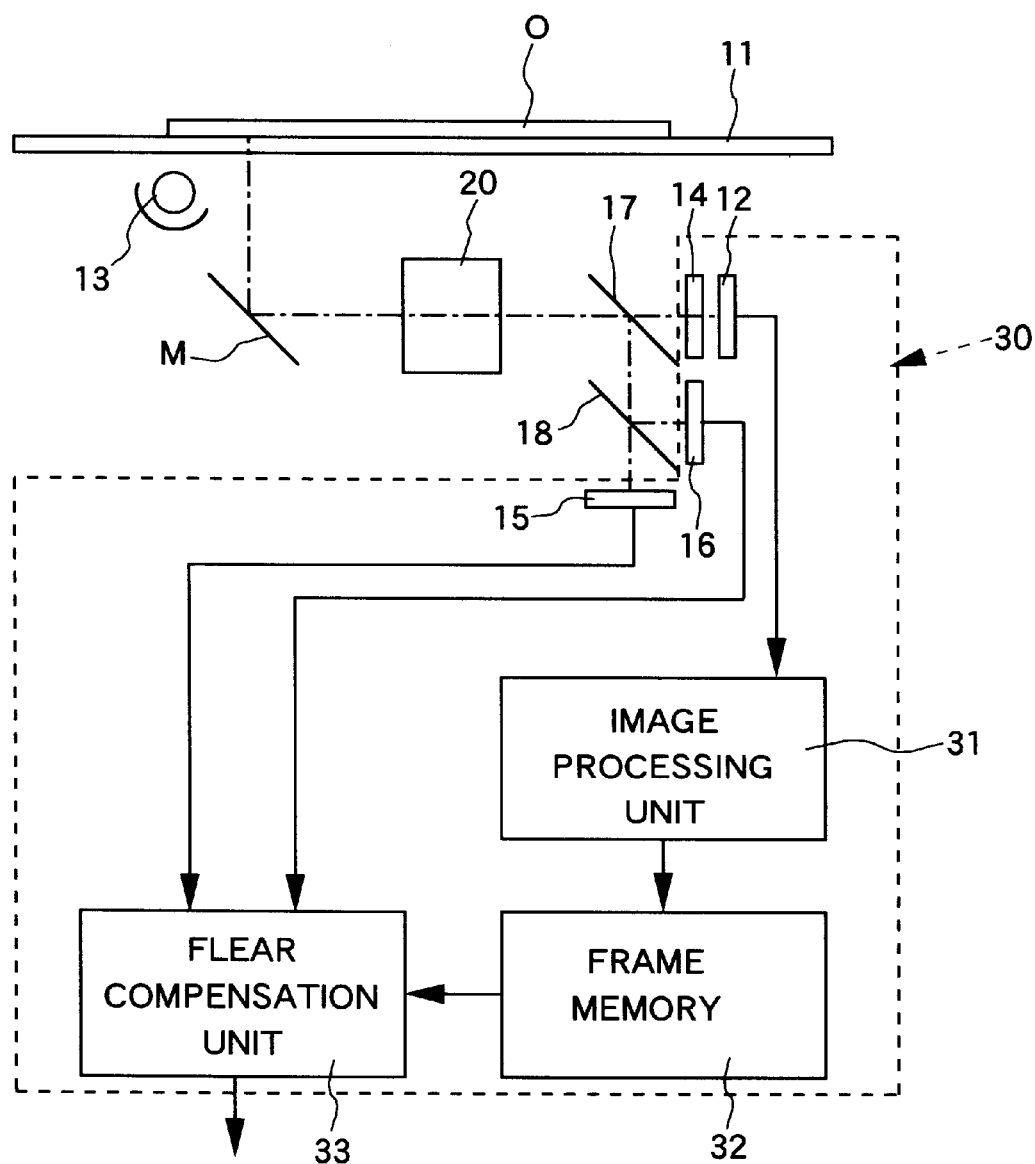
FIG. 11 shows an optical system and a block diagram of an image scanner according to the second embodiment.

FIG. 11 shows an image scanner of the second embodiment. In addition to the components of the first embodiment, a pair of auxiliary CCD 15 and 16 and beam splitters 17 and 18 is included. The first auxiliary CCD 15 comprises a line sensor and a chromatic filter that allows transmitting the R component. The second auxiliary CCD 16 also comprises a line sensor and a chromatic filter that allows transmitting the B component.

The first auxiliary CCD 15 is located at defocus position behind an equivalent plane with the main CCD 12 by distance dR. In the same manner, the second auxiliary CCD 16 is located at a defocus position behind the equivalent plane by distance dB.

The distance dR is determined so that a blurred spot of the first-order diffractive light from the object point P is substantially equal to the image area 51 of which radius is $\Psi_{Rmax}$. The distance dB is determined as the same manner so that a radius of the blurred spot is $\Psi_{Bmax}$. That is, the distances dR and dB are determined by the averages of the shift amounts of the image plane of the zeroth and second-order diffractive lights as the following equations.

$$dR = (\Delta 0R - \Delta 2R)/2$$

$$dB = (\Delta 0B - \Delta 2B)/2$$

As described above, since $\Psi_{Rmax}$ is larger than $\Psi_{Bmax}$, the distance dR is longer than the distance dB.

With such the arrangements of the auxiliary CCD, they output averaged light intensity signals.

The light from illuminated object O is reflected by the mirror M to be incident in the imaging optical system 20. The light from the imaging optical system 20 is divided by the first beam splitter 17. The ⅓ portion of the light is transmitted through the first beam splitter 17 to reach the main CCD 12. The remaining ⅔ portion of the light is reflected by the first beam splitter 17 and separated by the second beam splitter 18. A half portion of the light is incident into the first auxiliary CCD 15 and the remaining half portion of the light is incident into the second auxiliary CCD 16.

The flare compensation unit 33 calculates the compensated image signals Rop, Gop and Bop according to the following equations.

$$Rop = (Rmp - \alpha \cdot Rsp) \times \gamma_r$$

$$Gop = Gmp \times \gamma_g$$

$$Bop = (Bmp - \beta \cdot Bsp) \times \gamma_b$$

Where Rmp, Gmp and Bmp represent the original image signals from the target pixel of the main CCD that corresponds the object point P, Rsp and Bsp represent the average image signal from the pixels on the first and second auxiliary CCD that corresponds the target pixel on the main CCD, $\alpha$ and $\beta$ are correction coefficients for the R and B components, and $\gamma_r$, $\gamma_g$ and $\gamma_b$ are correction factors among the R, G and B components.

The flare compensation unit 33 executes the above calculations for all of the pixels within the predetermined reading area mapped on the frame memory 32.

The correction coefficients $\alpha$ and $\beta$ may be set within the following range under the conditions where a constant illuminance of the object results Rmp equals Rsp and Bmp equals Bsp.

$$0.03 < \alpha < 0.15$$

$$0.03 < \beta < 0.15$$

These are necessary and sufficient conditions for eliminating the flare components.

The transmittance $TRs(\lambda)$ of the chromatic filter for the first auxiliary CCD 15 has wavelength dependency that is defined by the following equation. The transmittance $TBs(\lambda)$ of the chromatic filter for the second auxiliary CCD 16 has also wavelength dependency that is defined by the following equations.

$$TRs(\lambda) \; TRm(\lambda) \times (1-E_R)$$

$$TBs(\lambda) \; TBm(\lambda) \times (1-E_B)$$

Where $TRm(\lambda)$ and $TBm(\lambda)$ represent wavelength dependencies of the transmittance in the color separation filters for the line sensors 12R and 12B of the main CCD 12, $E_R$ and $E_B$ represent the diffraction efficiencies of the diffractive grating. Such the settings of the chromatic filters for the auxiliary CCD 15 and 16 eliminate the possibility of surplus flare compensation.

The line sensors of the auxiliary CCD 15 and 16 are the same constructions (i.e. number and pitch of pixels) as that of the main CCD 12. If the imaging optical system 20 is a telecentric for an image side, defocus does not change the image size. In such the case, the signal Rsp from the predetermined pixel of the auxiliary CCD 15 can be used for correcting the signal Rmp from the pixel of the main CCD 12 of which address is identical to that of the auxiliary CCD 15.

On the other hand, when the imaging optical system 20 is not telecentric as shown in the first embodiment, the addresses are not coincident with each other when the same elements are used for the main CCD 12 and the auxiliary CCD 15. In such a case, pixel pitch of the auxiliary CCD may be different from the main CCD 12 to coincide the addresses with each other.

Further, the auxiliary CCD does not require the fine pitch pixel arrangement as the main CCD because the defocus image does not contain high frequency components. This allows using a CCD having coarse pitch pixel arrangement as the auxiliary CCD.

A CCD having any pitch pixel arrangement can be used for the auxiliary CCD even if the compensation unit 33 identifies the pixel in the auxiliary CCD corresponding to the target pixel on the main CCD 12.

Moreover, it is able to use a single auxiliary CCD instead of a pair of CCD. The single auxiliary CCD is required to move along the optical axis between the positions for the R component and the B component.

Third Embodiment

An image scanner of the third embodiment provides simple flare compensation using a total light amount of the R or B component from the object O. This embodiment is suitable for reading a character image such as a document.

Figure 12:
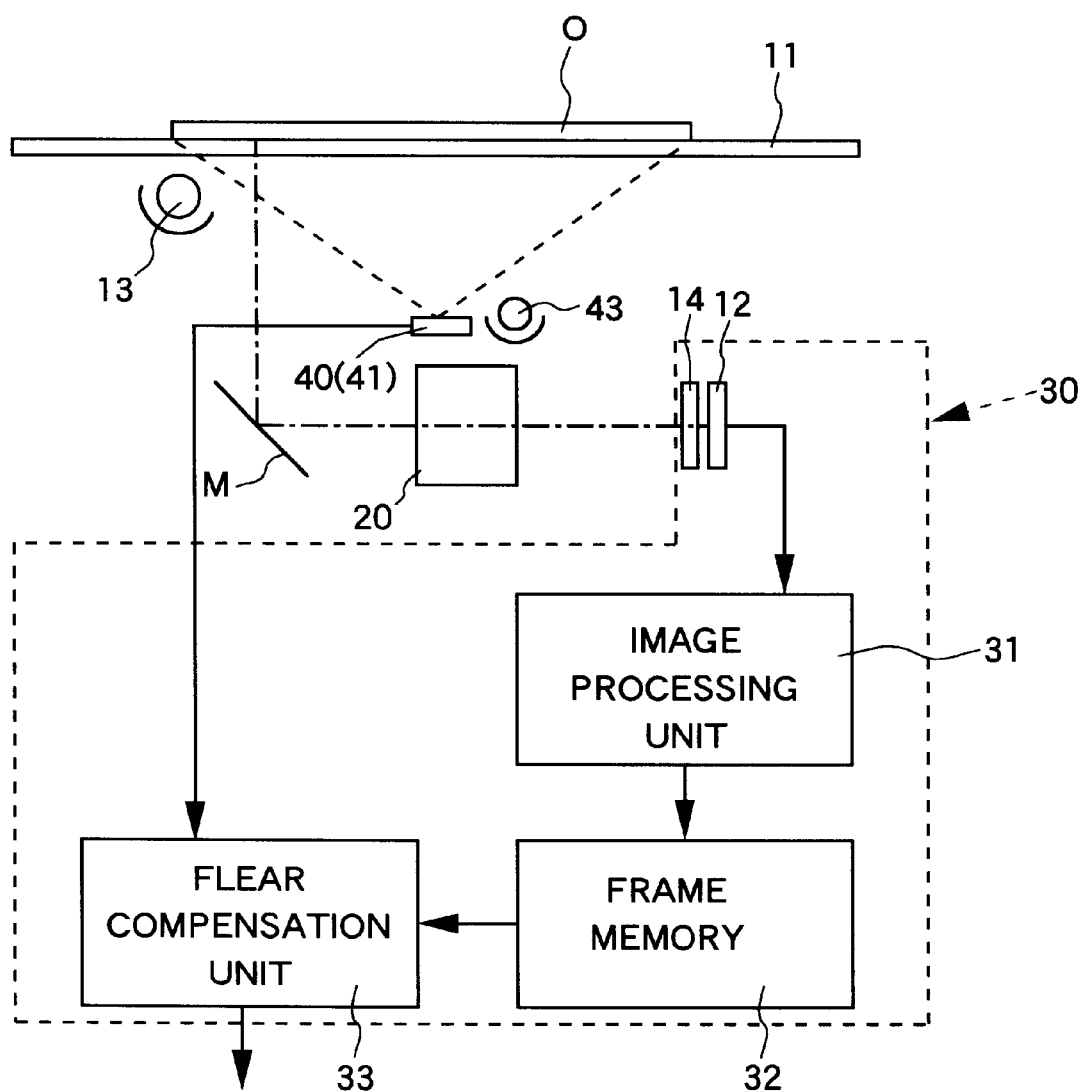
FIG. 12 shows an optical system and a block diagram of an image scanner according to the third embodiment.

FIG. 12 shows an image scanner of the third embodiment. In addition to the components of the first embodiment, the image scanner of the third embodiment is provided with light receiving elements 40 and 41, and a second light source 43. Before the feeding or scanning, the second light source 43 illuminates the object O and the light receiving element 40 receives the R component of the light from whole reading area of the object O through a chromatic filter (not shown). The light receiving element 41 receives the B component of the light from whole reading area of the object through a chromatic filter (not shown).

After that, the main CCD 12 detects the reflected light from the object O with feeding or scanning.

With this construction, the flare compensation unit 33 subtracts a constant value from the original image signal Rmp for all of the pixels. The subtracted value does not vary depending on the position of the target pixel (the image point p).

The flare compensation unit 33 calculates the compensated image signals Rop, Gop and Bop according to the following equations.

$$Rop = \frac{Rmp}{E_R} - \frac{(1-E_R) \times Rt}{St \times E_R}$$

$$Gop = Gmp$$

$$Bop = \frac{Bmp}{E_B} - \frac{(1-E_B) \times Bt}{St \times E_B}$$

Where Rmp, Gmp and Bmp represent the original image signals from the target pixel on the main CCD that corresponds the object point P, $E_R$ and $E_B$ represent the diffraction efficiencies at the center wavelengths of the respective R, G and B components, Rt represents the total signal from the light receiving element 40, Bt represents the total signal from the light receiving element 41, and St is square measure of the whole reading area of the object O.

The flare compensation unit 33 executes the above calculations for all of the pixels within the predetermined reading area mapped on the frame memory 32.

The present disclosure relates to subject matter contained in Japanese Patent Application No. HEI 9-287409, filed on Oct. 20, 1997, which is expressly incorporated herein by reference in its entirety.

What is claimed is:

1. An image reading system for reading color component images, said system comprising:

an imaging optical system that includes at least one refractive lens and a diffractive grating blazed at a predetermined wavelength, said optical system forming an image of an object by a predetermined order diffractive light;

an aperture stop positioned close to said diffractive grating;

a main image sensor for receiving the images of respective color components; and a flare compensation unit that compensates original image signals from said main image sensor to eliminate flare components due to unnecessary order diffractive light except said predetermined order diffractive light, wherein the aperture stop is arranged in a position near the diffractive surface where the aperture stop reduces dependence of the size of blurred spots of diffractive light upon the position of the blurred spots in the image plane.

2. The image reading system according to claim 1, wherein said diffractive grating is formed on a surface of said at least one refractive lens.

3. The image reading system according to claim 1, wherein said flare compensation unit compensates said original image signals of the color components except the color component including said blaze wavelength.

4. The image reading system according to claim 3, wherein said color components are R (red), G (green) and B (blue) and wherein said flare compensation unit compensates said original image signals of said R and B components.

5. The image reading system according to claim 1, wherein said flare compensation unit compensates said original image signals of a target pixel based on said original image signals of surrounding pixels within a predetermined image area, and wherein the extent of said image area is constant in spite of the position of said target pixel.

6. The image reading system according to claim 5, wherein said flare compensation unit produces compensated image signals Rop, Gop and Bop according to the following calculations;:

$$Rop = Rip/E_R - (1 - E_R)\left(\sum_{\psi=0}^{\psi Rmax} Rip_\psi\right) \Big/ (s_R \times E_R)$$

Gop=Gip $$Bop = Bip/E_B - (1 - E_B)\left(\sum_{\psi=0}^{\psi Bmax} Rip_\psi\right) \Big/ (s_B \times E_B)$$

where, Rip, Gip and Bip represent the original image signals of the R, G and B components at the target pixels of said main image sensors, $Rip_\psi$ and $Bip_\psi$ represent the original image signals of the respective R and B components at the point away from said target pixel by distance $\Psi$, and $S_R$ and $s_B$ represent square measures of said image area for the R and B components, $E_R$ and $E_B$ represent diffraction efficiencies of the R and B components.

7. An image reading system for reading color component images, said system comprising:

an imaging optical system that includes at least one refractive lens and a diffractive grating blazed at a predetermined wavelength, said optical system forming an image of an object by a predetermined order diffractive light;

a main image sensor for receiving the images of respective color components;

at least one auxiliary image sensor located at a defocus position being different from an equivalent plane with said main image sensor to output average intensity signals of the respective color components;

a beam splitter for dividing light from said object through said imaging optical system between said main image sensor and said auxiliary image sensor; and a flare compensation unit that compensates original image signals of target pixels of said main image sensor using said average intensity signals of the pixel corresponding to each target pixel in order to eliminate flare components due to unnecessary order diffractive light except said predetermined order diffractive light.

8. The image reading system according to claim 7, further comprising an aperture stop positioned close to said diffractive grating.

9. The image reading system according to claim 7, wherein said diffractive grating is formed on a surface of said at least one refractive lens.

10. The image reading system according to claim 7, wherein said flare compensation unit compensates said original image signals of the color components except the color component including said blazed wavelength.

11. The image reading system according to claim 10, wherein said color components are R, G and B components, first and second auxiliary image sensors for the R and B components are provided, and wherein said flare compensation unit compensates said original image signals of said R and B components.

12. The image reading system according to claim 11, wherein said flare compensation unit calculates the compensated image signals Rop, Gop and Bop according to the following equations:

$$Rop=(Rmp-\alpha \cdot Rsp)\times\gamma_r$$

$$Gop=Gmp\times\gamma g$$

$$Bop=(Bmp-\beta \cdot Bsp)\times\gamma_b$$

where Rmp, Gmp and Bmp represent the original image signals from the target pixel of said main image sensors, Rsp and Bsp represent the original image signal from the pixel on the first and second auxiliary sensors that corresponds to said target pixel, $\alpha$ and $\beta$ are correction coefficients for the R and B components, and $\gamma_r$, $\gamma_g$ and $\gamma_b$ are correction factors among the R, G and B components.

13. The image reading system according to claim 12, wherein said correction coefficients $\alpha$ and $\beta$ may be set within the following range under the conditions where a constant illuminance of the object results Rmp equals Rsp and Bmp equals Bsp;

$$0.03<\alpha<0.15,$$

$$0.03<\beta<0.15.$$

14. An image reading system for reading color component images, said system comprising:

an imaging optical system that includes at least one refractive lens and a diffractive grating blazed at a predetermined wavelength, said optical system forming an image of an object by a predetermined order diffractive light;

a main image sensor for receiving the images of respective color components;

at least one light receiving element, said light receiving element receiving the light from a whole reading area of said object to output a total intensity signal from said at least one light receiving element;

a flare compensation unit that compensates original image signals from target pixels of said main image sensor using said total intensity signal from said light receiving element in order to eliminate flare components due to unnecessary order diffractive light except said predetermined order diffractive light.

15. The image reading system according to claim 14, further comprising an aperture stop positioned close to said diffractive grating.

16. The image reading system according to claim 14, wherein said diffractive grating is formed on a surface of said at least one refractive lens.

17. The image reading system according to claim 14, wherein said flare compensation unit processes said original image signals of the color components except the color component including said blazed wavelength.

18. The image reading system according to claim 17, wherein said color components are R, G and B components, first and second light receiving elements for the R and B components are provided, and wherein said flare compensation unit processes said original image signals of said R and B components.

19. The image reading system according to claim 18, wherein said flare compensation unit calculates the compensated image signals Rop, Gop and Bop according to the following equations:

$$Rop = \frac{Rmp}{E_R} - \frac{(1-E_R) \times Rt}{St \times E_R}$$

$$Gop = Gmp$$

$$Bop = \frac{Bmp}{E_B} - \frac{(1-E_B) \times Bt}{St \times E_B}$$

where Rmp, Gmp and Bmp represent the original image signals from the target pixel of said main image sensors, $E_R$ and $E_B$ represent the diffraction efficiencies at the center wavelengths of the respective R, G and B components, Rt represents the total signal from the red light receiving element, Bt represents the total signal from the blue light receiving element, and St is square measure of the whole reading area of the object O.

* * * * *